UNITED STATES PATENT OFFICE 2,395,842

GAS ABSORBENT MATERIAL AND PROCESS OF MAKING THE SAME

Parry Borgstrom, Washington, D. C.

No Drawing. Application July 14, 1930,
Serial No. 467,998

9 Claims. (Cl. 252—190)

(Granted under the act of March 3, 1883, as
amended April 30, 1928; 370 O. G. 757)

This invention relates to a material having the property of absorbing large quantities of gases and to a process of preparing this material.

It has heretofore been known that noxious gases could be eliminated to some extent from mixtures of gases which sometimes occur in closed chambers such as submarines, vaults, or even ordinary buildings, or from the exhaust gases of internal combustion engines, or certain industrial plants, by bringing the said gases into contact with various chemicals having the property of absorbing the noxious gases. Some of the principal substances which have been known to be useful as gas-absorbents are soda lime, caustic soda, caustic potash, activated charcoal and kieselguhr. These substances are found to be unsatisfactory and inefficient in that the amounts of gases they will absorb is small and certain of them have a tendency to become gummy unless a binder is used. When soda lime is used for purifying the atmosphere in closed chambers, the atmosphere soon becomes extremely irritating to the nose and throat. Gas-absorbent chemicals have also been used by the medical science as gas-absorbents in metabolism tests. When used in one of these tests, the gas-absorbent properties of the chemicals sometimes become exhausted before completion of the test, thereby necessitating repetition with further discomfort and delay which may have serious consequences to the patient.

An object of this invention is to provide a gas-absorbent substance which will absorb large quantities of noxious gases from impure atmospheres or exhaust gases.

Another object of this invention is to provide a gas-absorbent substance which will not become gummy upon exposure to the atmosphere and which may be prepared in a condition permitting expeditious and efficient use.

Another object of this invention is to provide a gas-absorbent material which will purify the atmosphere in a closed chamber without imparting an irritating effect to the atmosphere therein.

A further object of this invention is to provide a novel process of preparation of the gas-absorbent substance.

Another object of this invention is to provide a process of producing lithium hydroxide or the hydrate thereof in a porous condition.

I have discovered that lithium hydroxide properly prepared is a highly efficient absorbent of carbon dioxide, chlorine and other gases that react with alkali, and with other gases that do not react with alkali, lithium hydroxide may be used effectively as a mechanical filter to catch and retain such gases. In testing this substance prepared in accordance with my invention, I have found that 4.77 grams of lithium hydroxide absorbed in two hours 3.63 grams of carbon dioxide or 76% of its weight, while under the same conditions soda lime of 8–14 mesh absorbed only 8% of its weight.

Hydrate of lithium hydroxide is also found to be an active and efficient absorbent of carbon dioxide and other gases. Lithium hydroxide in the anhydrous state rapidly absorbed as much as 85% of its weight of carbon dioxide, while where the monohydrate of LiOH was used, the absorber did not become warm, and on the dry basis, it was as efficient as the anhydrous material.

My new gas-absorbent may be satisfactorily prepared by mixing lithium hydroxide hydrate, or lithium hydroxide to which sufficient water has been added to form a hydrate, with 20% of its weight of sodium silicate (20%) solution. This mixture may be moulded to a desired shape and heated to a temperature sufficient to drive off the water. The resulting mass is porous and reacts readily with carbon dioxide absorbing it to 85% to 90% of its weight. The term "porous" is used with the intended meaning of signifying that the material itself is full of pores. In this sense the mass is to be considered porous whether it is a single large lump, or a number of smaller ones. This mass may be suitably crushed and packed in canisters for storage, transportation, and use.

Although my gas-absorbent material may be prepared in different ways, a number of these methods preferably involve the production of lithium hydroxide by dehydration of a hydrate thereof. It is preferable to effect the dehydration in the absence of carbon dioxide or other gases as an absorbent of which the material is to be used.

It is found that in addition to absorbing carbon dioxide and chlorine, lithium hydroxide or the hydrate thereof will also absorb a number of other gases such as hydrogen sulfide, hydrogen cyanide, sulfur dioxide, the halogens (including chlorine), and other acid gases.

By producing lithium hydroxide by the dehydration of lithium hydroxide hydrate with or without a binder, a porous material is produced which is readily penetrated by gases thereby utilizing the entire mass of the material rather than merely the surface of the substance. When a suitable binder such as sodium silicate in solution is mixed with the lithium hydroxide hydrate before dehydration, a hard substance is formed which is more easily handled and transported. This material may be crushed and packed in canisters ready for use. The crushed material readily conforms to the shape of the canister and fills the entire cross sectional area thereof, thereby ensuring that the gas will not pass around the absorbent adjacent the sides of the canister and that all of the gas will be forced to contact with the absorbent material in passing through the canister.

When moist gases are passed through the dehydrated hydrate of lithium hydroxide or in other words through the porous anhydrous lithium hydroxide, the moisture combines with the lithium hydroxide to form the monohydrate, but this reaction does not destroy the porosity of the material and the substance remains a highly efficient gas-absorbent.

Lithium hydroxide and lithium hydroxide hydrate, as proven by extensive tests and experiments, are found to be far superior to any gas absorbents now in use. The atmosphere treated by lithium hydroxide or its hydrate has no irritating or other bad effect upon the nose and throat. The material has no tendency to deliquesce or become gummy even when left exposed to moist air for long periods of time. When used in metabolism tests, lithium hydroxide or its hydrate will retain the gas-absorbent property for a much greater period of time than will the gas-absorbents now used for this purpose, thus minimizing the liability of the material becoming exhausted before completion of the test.

The invention herein described may be manufactured and used by or for the Government of the United States for governmental purposes without the payment to me of any royalty thereon or therefor.

I claim:

1. A gas-absorbent material comprising a dehydrated mixture of lithium hydroxide hydrate and sodium silicate.

2. A gas-absorbent material comprising small particles of a dehydrated mixture of lithium hydroxide hydrate and sodium silicate solution.

3. A gas-absorbent material comprising small porous particles of a dehydrated mixture of lithium hydroxide hydrate and a binder.

4. The process of preparing a gas-absorbent comprising mixing a basic compound of lithium with a binder in solution and drying the mixture.

5. The process of preparing a gas-absorbent substance comprising mixing lithium hydroxide with a binder in solution and heating the mixture to remove the solvent.

6. The process of preparing a gas-absorbent substance comprising mixing lithium hydroxide with a binder in solution, drying the mixture and crushing the same.

7. The process of preparing a gas-absorbent substance comprising adding to lithium hydroxide sufficient water to form a hydrate, mixing the same with a solution of sodium silicate, and drying the mixture.

8. The process of preparing a gas-absorbent material comprising mixing lithium hydroxide hydrate with a solution of sodium silicate and dehydrating the mixture.

9. The process of preparing a gas-absorbent comprising mixing lithium hydroxide hydrate with a binder in solution, dehydrating the mixture and crushing the resulting mass.

PARRY BORGSTROM.